United States Patent
Pietrowicz (10) Patent No.: US 7,917,562 B2
(45) Date of Patent: Mar. 29, 2011

(54) METHOD AND SYSTEM FOR ESTIMATING AND APPLYING A STEP SIZE VALUE FOR LMS ECHO CANCELLERS

(76) Inventor: Stanley Pietrowicz, Freehold, NJ (US)

( * ) Notice: Subject to any disclaimer, the term of this patent is extended or adjusted under 35 U.S.C. 154(b) by 1176 days.

(21) Appl. No.: 10/978,204

(22) Filed: Oct. 29, 2004

(65) Prior Publication Data

US 2006/0095488 A1 May 4, 2006

(51) Int. Cl.
  *G06F 17/10* (2006.01)
  *H04M 9/08* (2006.01)
(52) U.S. Cl. .................................. 708/322; 379/406.08
(58) Field of Classification Search ................ 708/322, 708/323
  See application file for complete search history.

(56) References Cited

U.S. PATENT DOCUMENTS 5,325,204 A * 6/1994 Scarpa .......................... 348/607
5,721,772 A * 2/1998 Haneda et al. ............ 379/406.14
6,810,273 B1 * 10/2004 Mattila et al. ................. 455/570

OTHER PUBLICATIONS

S.L. Gay "Fast Projection Algorithms with Application to Voice Echo Cancellation", Ph.D. Dissertation, Rutgers The State University of New Jersey, New Brunswick, New Jersey, 1994.
D. Messerschmitt et al., "Digital Voice Echo Canceller with a TMS32020", Application Report: SPRA 129, Digital Signal Processing Solutions, 1989, Texas Instruments, http://focus.ti.com/lit/an/spra129/spra129.pdf, retrieved on Oct. 25, 2004.

\* cited by examiner

*Primary Examiner* — Chuong D Ngo
(74) *Attorney, Agent, or Firm* — McDonnell Boehnen Hulbert & Berghoff LLP (57) ABSTRACT

Disclosed is an improved method and apparatus for estimating and applying a step size value for a least mean squares echo canceller. A power estimate of an excitation signal is compared to a reference power level to determine a shift adjustment. The shift adjustment is added to a reference shift amount to determine a shift amount. The product of an excitation signal and an error signal is then calculated and the product is stored in a memory register comprising a plurality of bits. The bits stored in the memory register are shifted either left or right based upon the shift amount. The shift adjustment may be based in part upon the ratio of the excitation signal power estimate and the reference power level.

42 Claims, 6 Drawing Sheets

METHOD AND SYSTEM FOR ESTIMATING AND APPLYING A STEP SIZE VALUE FOR LMS ECHO CANCELLERS

BACKGROUND OF THE INVENTION

The present invention relates generally to echo cancellers, and more particularly to estimating and applying a step size value for least mean squares echo cancellers.

Figure 1A:
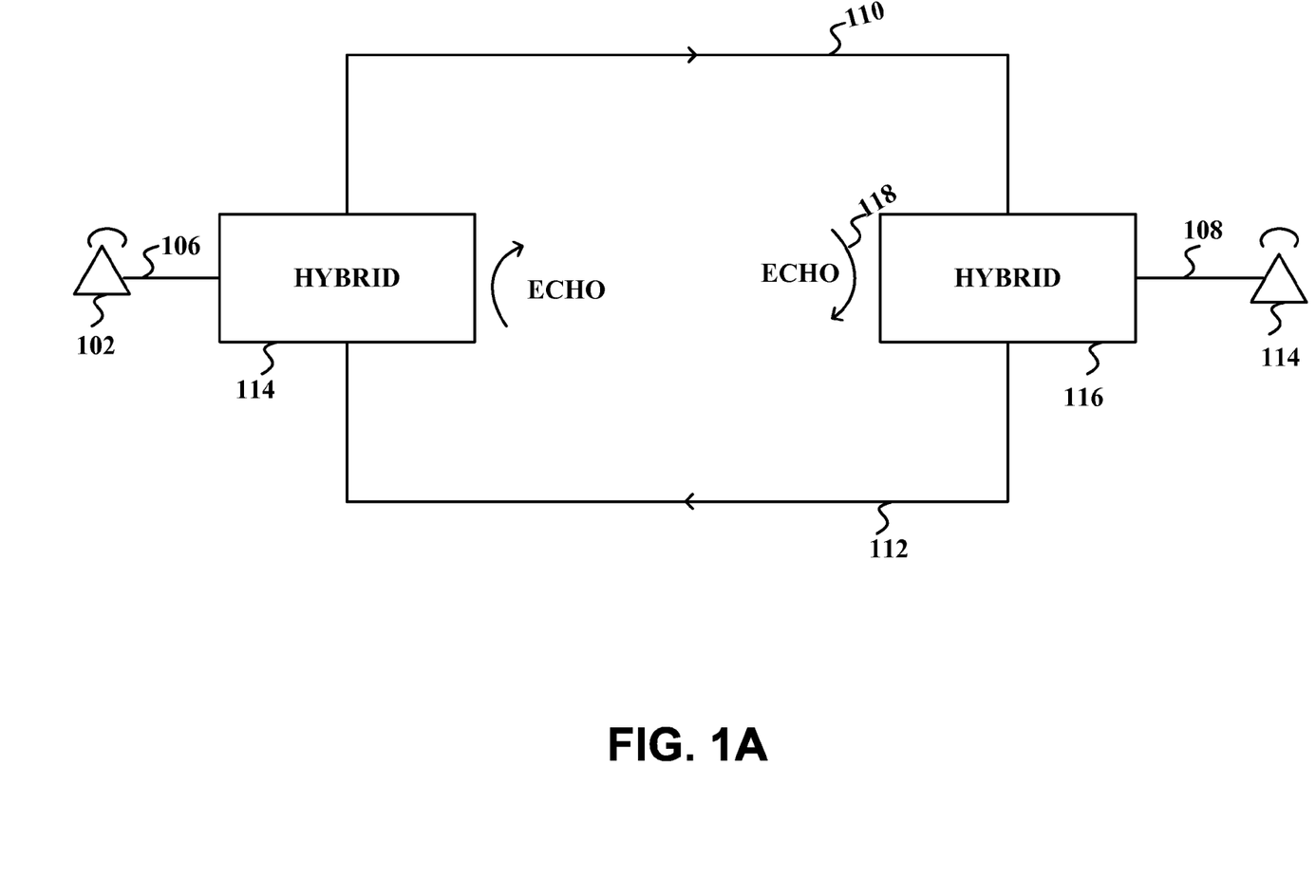
FIG. 1A shows a simplified connection between two telephones in a typical telephony network.

Echo is a well known impairment of telecommunication systems which causes a degradation in the quality of transmission. One type of echo is a result of the design of a typical telephony network and is illustrated in FIG. 1A which shows a simplified connection between two telephones 102 and 104. Subscriber 102 is connected to the network via two-wire subscriber loop 106 and subscriber 104 is connected to the network via two-wire subscriber loop 108. The two-wire subscriber loops 106 and 108 transmit bi-directional voice signals over the twisted wire pair. Within the access network, there are four-wire trunks 110 and 112 which carry uni-directional voice signals. Trunk 110 carries signals from telephone 102 to telephone 104, and trunk 112 carries signals from telephone 104 to telephone 102. The segregation of the signals within the access network is necessary where it is desired to insert various network components, such as amplifiers and digital switches. The four-wire trunk lines of the access network, and the two-wire subscriber loops, are connected by hybrids 114 and 116. The hybrids convert the signals from two-wire transmission to four-wire transmission. Thus, the function of hybrid 116 is to direct the signal energy arriving from telephone 102 via trunk line 110 to the two-wire subscriber loop 108 without allowing it to return to telephone 102 via trunk line 112. However, due to characteristics of the network (e.g., impedance mismatches), some of the signal energy is returned to telephone 102, as illustrated by the echo 118. This results in network echo as the user of telephone 102 will hear a delayed version of his/her speech. The echo caused by the function of a hybrid is similarly present at the point of interconnection between the traditional telephone network and next generation packet networks where four wire trunks are converted to the digital domain for transmission over a packet network, such as an IP network or ATM network. The foregoing discussion illustrates an electrically generated echo.

Figure 1B:
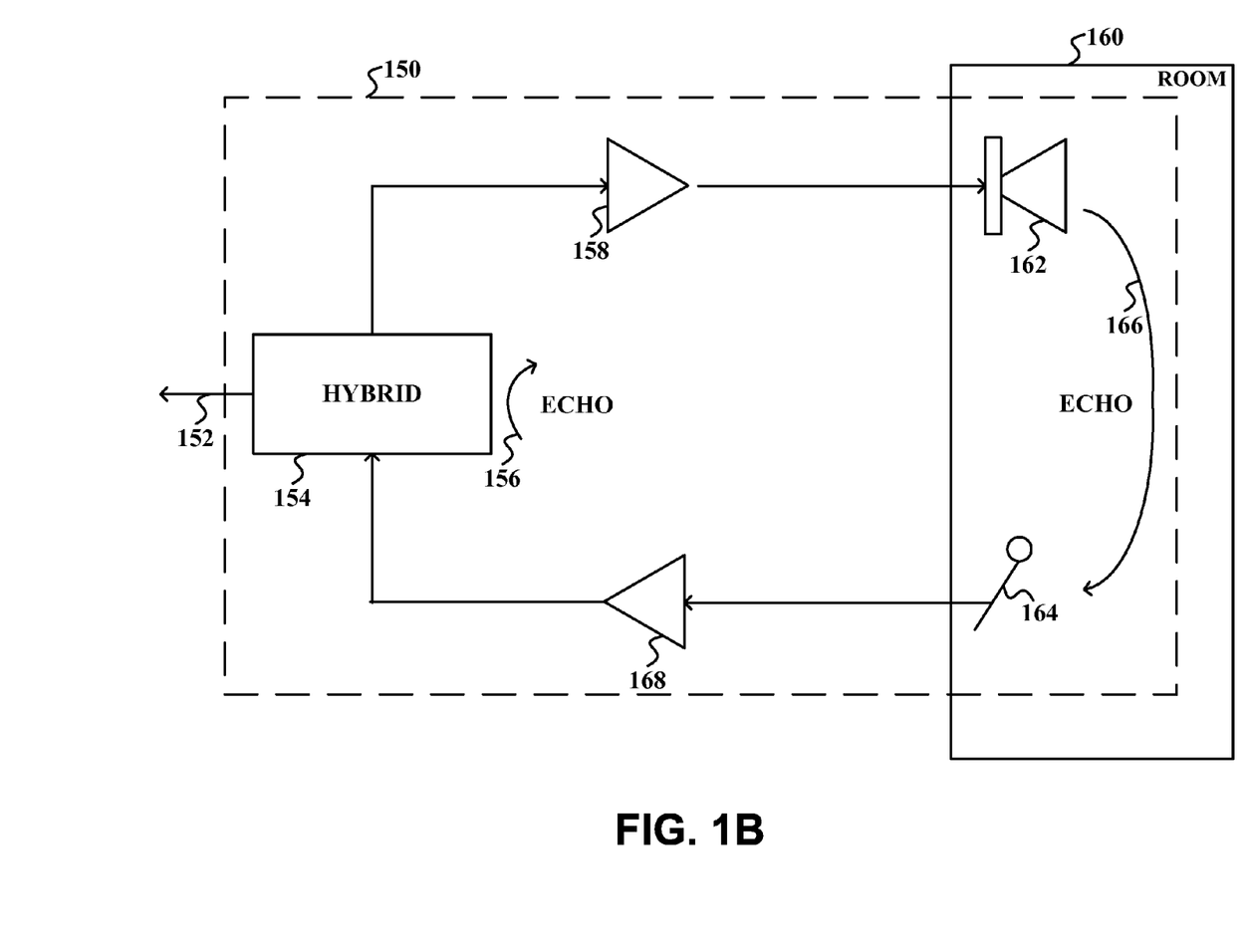
FIG. 1B shows a simplified speakerphone with both acoustic and line echoes.

Another type of echo is acoustic echo, which is a problem with speakerphones, and occurs when the sound output from the speaker is acoustically coupled back into the microphone and gets transmitted back to the far end as echo as illustrated in FIG. 1B. FIG. 1B shows a speakerphone 150 connected to a 2-wire local loop 152 via hybrid 154. Incoming voice signals are amplified by speaker amplifier 158 and are then passed into room 160 via speaker 162. The sound waves from speaker 162 reflect off of the walls and other objects in room 160 and return to microphone 164 as echo 166. This echo is amplified by microphone amplifier 168 and eventually transmitted to the far end via local loop 152. Acoustic echoes generally have more delay and a longer reverberation time than electrically generated echoes due to the fact that the echo transmission means is reflected sound waves. It is noted that the function of hybrid 154 also results in line echo 156 as discussed above in connection with FIG. 1A.

Echo in telecommunication systems and devices is a well known problem and various solutions exist to reduce echo. One current solution is the use of an echo canceller, which, at a high level, uses a copy of the signal incoming to the listener to estimate the echo that should return on the outgoing line from the listener. This estimate is then subtracted from the outgoing signal in order to cancel the echo. During periods when there is no signal on the outgoing line (e.g., the listener is not talking) the echo canceller expects a near-zero signal on the outgoing line, with only ambient noise present. Deviations from this value are used to update the calculation of the echo estimate such that this deviation is minimized. The echo canceller is adaptive in that it uses deviations from the expected near-zero signal to adapt its operation in order to minimize the deviation. Adaptation is particularly important with acoustic echo cancellers because the acoustic echo path changes whenever an object collocated with the speakerphone, such as a chair or person, changes position.

One popular implementation of echo cancellers is by means of digital filters, whose coefficients must be updated in order to model the impulse response of the echo path. Adaptive filter algorithms are well known in the art and have the ability to process signals coming from an unknown environment in order to extract the needed information. Adaptive filters consist of two parts, the filter and the adaptation algorithm. The filter actually produces the signal estimate, while the adaptation algorithm updates the coefficients of the filter. One common family of adaptive algorithms for echo cancellers are least mean squares (LMS) based algorithms. These LMS algorithms are well known in the art, and will be discussed in further detail below. One current problem with these algorithms is that their implementation is highly computation intensive, and optimal performance, i.e., deep convergence, is difficult to obtain in resource constrained digital signal processing applications. In particular, it is the adaptation algorithms (i.e., coefficient calculation) that require a significant amount of processing power. For each sample, every filter coefficient in the classic normalized LMS algorithm is updated by a quotient whose numerator is the product of the excitation signal, the error signal and the step size, and whose denominator is a power estimate of the excitation signal. This process is the most computationally intensive part of the echo canceller, performing two multiplications, one division (or the equivalent combination of an inverse function and multiplication), three product stores, and several shifts necessary to maintain the whole number portion of the product. In the process of these multiplications, the products are often truncated because of the limited word length in the processor accumulator or memory registers. The impact of value truncation is a loss of precision especially for small update values and this has the effect of preventing the echo canceller from reaching its optimal performance. Furthermore, division is a mathematical operation that is not supported by almost all digital signal processors because it is hardware intensive to implement. As a result, the division operation is usually performed as the combination of a software inverse function and multiplication. The inverse function is an iterative algorithm that is itself computationally intensive. As such, prior art implementations of LMS echo cancellers tend to be computationally intensive and incur precision errors that degrade echo canceller performance.

What is needed therefore, is an improved system and method for implementing an echo canceller that provides deep convergence with reduced computational complexity.

BRIEF SUMMARY OF THE INVENTION

The present invention provides an improved technique for estimating and applying a step size value for a least mean squares echo canceller. An echo canceller implemented in accordance with the principles of the present invention compares an excitation signal power estimate against a reference power level for which an appropriate reference step size has been previously determined. A previously computed product of the excitation signal and the error signal, which has been stored in a memory register, is then shifted depending upon the comparison. The reference step size is selected such that the echo canceller adapts to deep convergence within the desired convergence time using an excitation signal that is characteristic of the application at the reference power level. The reference power level is chosen near the middle of the expected dynamic range of the excitation signal such that the maximum expected right and left shifts are balanced and can be implemented by the processor. The present invention takes advantage of the recognition that there is a relationship between the reference power level and the reference step size by implementing part of the NLMS coefficient update algorithm as a shift of the previously stored product of the excitation signal and the error signal rather than as conventional mathematical computations. This technique results in significant processing efficiency as well as improved precision in the coefficient update.

In accordance with one embodiment of the invention, a power estimate of an excitation signal is compared to a reference power level to determine a shift adjustment. The product of an element of an excitation signal vector and an error signal is then calculated and the product is stored in a memory register comprising a plurality of bits. The bits stored in the memory register are shifted either left or right based upon comparison.

The shift may be based in part upon the ratio of the excitation signal power estimate and the reference power level. For example, if the power estimate of the excitation signal is substantially the same as the reference power level, then the shift may be in the amount of a previously determined reference shift amount (e.g., a number of bit shifts left or right). If the power estimate of the excitation signal is not substantially the same as the reference power level then the shift may be based at least in part on the power of two by which the excitation signal power estimate is greater than the reference power level, or the power of two by which the reference power level is greater than the excitation signal power estimate. If the excitation signal power estimate is greater than the reference power level, then a number of right shifts is added to the reference shift amount, and if the reference power level is greater than the excitation signal power estimate then a number of left shifts is added to the reference shift amount.

In an advantageous embodiment, the shift adjustment to the reference shift amount may be calculated as 2 times the above described power of two in order to take advantage of the fact that the step size changes by the square of the power ratio of the excitation signal to the reference level.

These and other advantages of the invention will be apparent to those of ordinary skill in the art by reference to the following detailed description and the accompanying drawings.

DETAILED DESCRIPTION

Figure 2:
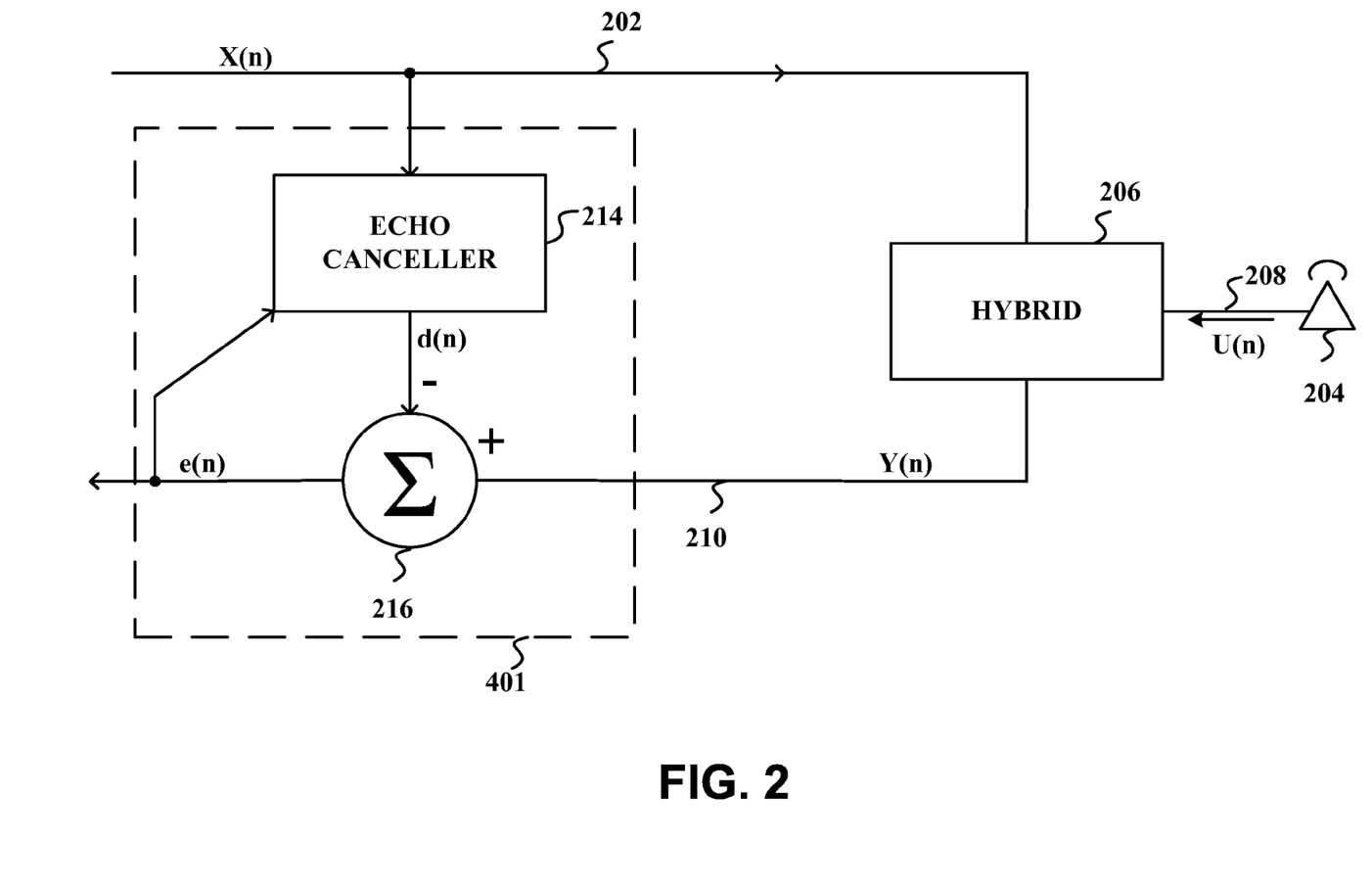
FIG. 2 shows a high level block diagram of a network architecture which includes an echo canceller.

FIG. 2 shows a high level block diagram of a network architecture which includes an echo canceller 214. As shown in FIG. 2, X(n) is the signal received on line 202 from the far end telephone (not shown), also called the excitation signal. As discussed above, in a typical network architecture, line 202 may be a four-line trunk which carries voice signals from the far end telephone to the near end telephone 204. The hybrid 206 directs the signal energy arriving from the far end telephone via trunk line 202 to the two wire subscriber loop 208 without allowing it to return to the far end telephone via trunk line 210. However, as discussed above, some portion of the excitation signal X(n) gets reflected back on line 210 as an echo due to an impedance mismatch, and this echo gets added to the signal U(n) which originates at near end telephone 204. The resulting signal is Y(n). The near end telephone signal U(n) will be zero or near-zero considering ambient noise when only the user of the far end telephone is talking. Thus, during such periods, signal Y(n) represents the echo signal. The echo canceller 214 produces signal d(n) which is the signal estimate that is subtracted from signal Y(n) as represented by 216. If the signal estimate d(n) was a good estimate of the echo signal Y(n), then the resulting signal will be close to zero. The extent to which such signal is not zero represents the estimation error signal e(n). This error signal e(n) is fed back into the echo canceller 214 to correct the estimation process. As such, the echo canceller 214 continuously adapts its calculations to the current echo environment during periods when only the far end user is talking.

As described above, the echo canceller 214 is implemented as an adaptive filter which consists of two parts, the filter itself and the adaptation algorithm. The filter produces the signal estimate d(n) and the adaptation algorithm updates the coefficients of the filter to the current echo environment. The filter is generally implemented as a well known linear transversal filter or tapped delay line filter, with a number of filter taps (although nonlinear filters are theoretically possible). The filter weights, or coefficients, are updated to match the impulse response of the hybrid 206, i.e., the echo path. The filter is convolved with the excitation signal X(n) to produce estimate d(n) of the hybrid output y(n). The adaptation algorithm determines the sign and magnitude of each filter coefficient such that the error, represented by e(n), is minimized in the least squares sense.

One well known and common adaptation algorithm for echo cancellers is the least means squares (LMS) algorithm, as described in *Digital Signal Processing—A Practical Approach*, Emmanuel C. Ifeachor and Barrie W. Jervis, Addison-Wesley, 1993, pp. 541 et seq., which is incorporated herein by reference. The generation of filter coefficients in accordance with this algorithm requires the evaluation of the following equation:

$$\bar{h}(n+1) = \bar{h}(n) + \mu \times e(n) \times \bar{X}(n)$$

where $\bar{h}(n+1)$ represents the next vector of filter coefficients for time n+1, $\bar{h}(n)$ represents the current vector of filter coefficients for time n, $\mu$ represents the step size, e(n) represents the error, and $\bar{X}(n)$ represents the excitation signal vector received from the far end source.

In situations where the power of the excitation signal X(n) has large variations, i.e., it is a highly colored signal such as speech, the performance of the LMS algorithm may be improved by normalizing the update process using well known Normalized LMS (NLMS) as described for example in, S. L. Gay "Fast Projection Algorithms with Application to Voice Echo Cancellation", Ph.D. Dissertation, Rutgers The State University of New Jersey, New Brunswick, N.J., 1994. In accordance with the well known NLMS algorithm, the vector term $e(n) \times \overline{X}(n)$ is normalized with respect to a power estimate of the excitation signal $P_{\overline{X}}$. Thus, the generation of filter coefficients in accordance with the NLMS algorithm requires the evaluation of the equation:

$$\overline{h}(n+1) = \overline{h}(n) + \frac{\mu \times e(n) \times \overline{X}(n)}{P_{\overline{X}}}$$

The description up to this point has described well known echo cancellation techniques, and more particularly has focused on LMS and NLMS techniques for calculating updated filter coefficients. It would be well understood by one skilled in the art that implementation of the NLMS algorithm, and the required evaluation of the above described NLMS equation, would require a large amount of processing power when implemented in a typical manner on a digital signal processor. For example, a typical sample rate in a telecommunication system is 8000 samples per second, and so the above described equation must be evaluated 8000 times per second during coefficient updating. Further, since the equation operates on vectors, each evaluation of the equation actually requires multiple computations, one for each of the elements of the vector. Thus, assuming 500 filter taps, the equation will be evaluated 8,000×500=4,000,000 times per second. Thus, in terms of processor instructions, each processor instruction required to evaluate the above coefficient update equation would alone consume 4 million instructions per second (4 MIPS). If we assume the above equation can be implemented in 8 instructions if all the operands where immediately available, the coefficient update process would take some 32 MIPS. This, of course, excludes the processing power to actually execute the filter, calculate power estimates, perform inverse functions and make a determination of when to adapt the echo canceller.

There are several problems with implementing the above described NLMS algorithm in a digital signal processor. First, evaluation of the above described NLMS equation requires a division, or inverse, function. As is well known in the art of digital signal processing and computer processing, a division or inverse function requires a significant number of processor instructions that need to be executed with every new sample. This results in a limitation on the number of evaluations possible and a resultant limitation on the calculation of filter coefficients. Another problem is that, due to limitations on the size of processor memory registers and bit width of the arithmetic logic unit, a loss of precision occurs in fixed length processors when performing multiple multiplication, division and inverse functions. Both of these problems negatively affect the echo canceller performance as improper adaptive filter coefficient adjustments result in divergence or the inability to seat for deep convergence.

The present invention overcomes the limitations of the prior art by eliminating the need to perform an inverse or division operation in the implementation of an NLMS echo canceller. Instead, an echo canceller in accordance with the present invention compares a power estimate of the excitation signal against a reference power level for which an appropriate step size (i.e., a reference step size) has been previously determined. A previously computed product of the excitation signal and the error signal, which has been stored in a memory register, is then shifted depending upon the comparison.

Figure 3:
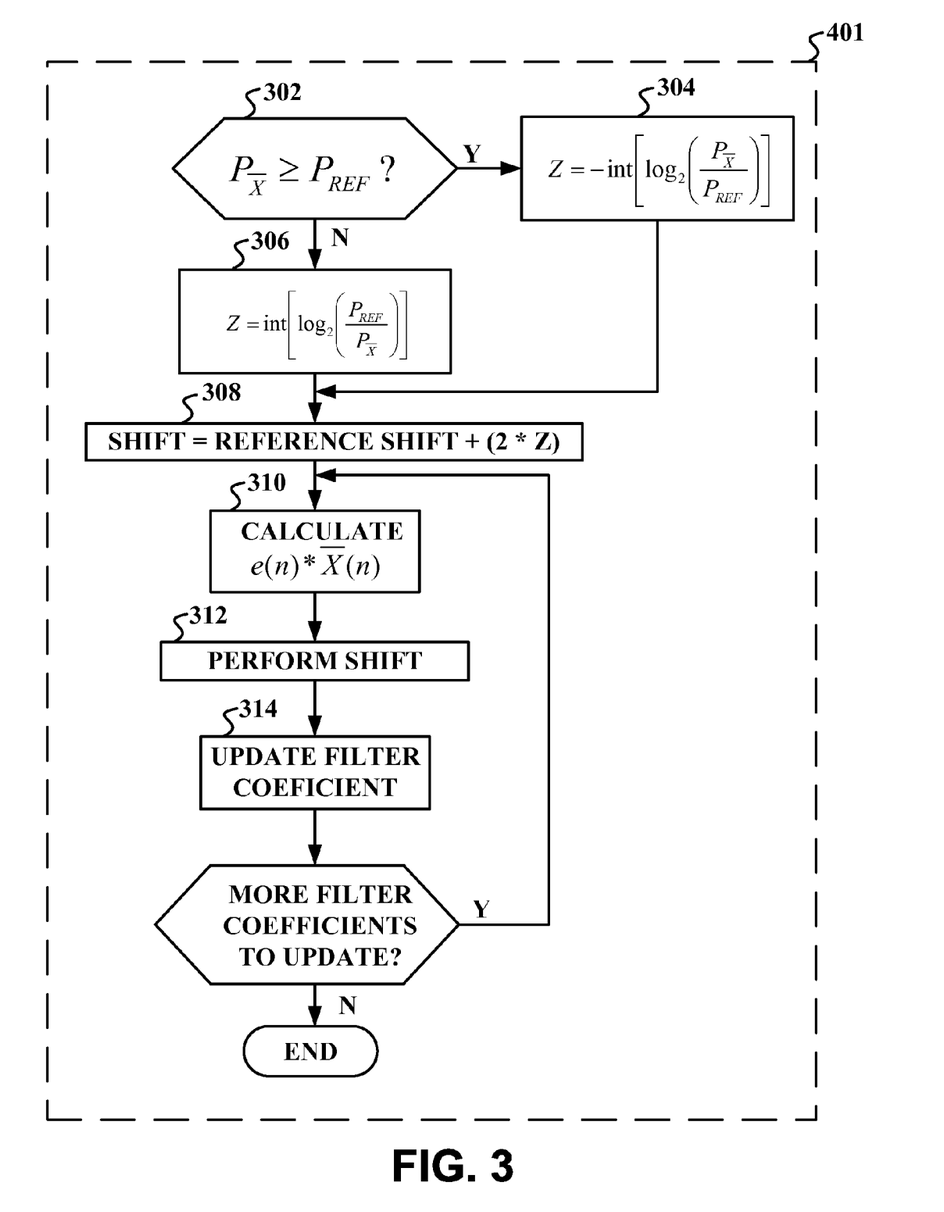
FIG. 3 shows a flowchart of the steps performed by an echo canceller in accordance with one embodiment of the invention.
Figure 4:
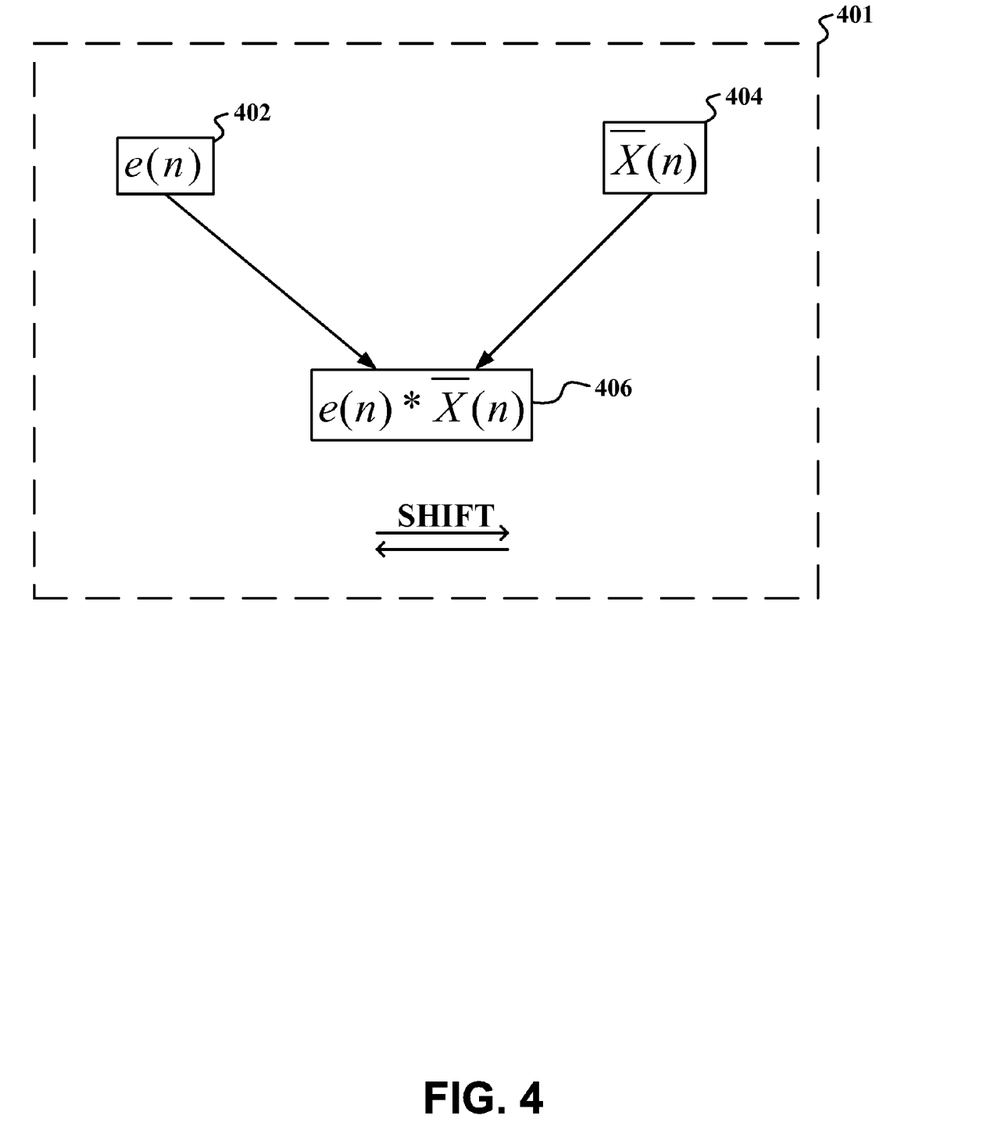
FIG. 4 is a graphical representation of a computation utilizing processor memory registers.

FIG. 3 shows a flowchart of the steps performed by an echo canceller in accordance with an embodiment of the invention. To illustrate the difference between the present invention and the prior art, assume the step size has already been calculated. At step 310, a product of an element of the excitation signal vector $\overline{X}(n)$ and the scalar error signal $e(n)$ is calculated and the result is stored in a memory register of a digital signal processor 401 (DSP) (or other processor or memory unit). A graphical representation of this computation is shown in FIG. 4 which shows the error signal $e(n)$ stored in a memory register 402 and the element of the excitation signal vector $\overline{X}(n)$ is stored in a memory register 404. In one advantageous embodiment, both memory registers 402 and 404 may be 32 bit registers in an arithmetic logic unit of DSP 401 or other computer processor capable of performing 16×24 bit multiplication. Assume that error signal $e(n)$ is a signed 16 bit value and excitation signal $\overline{X}(n)$ is a vector of signed 16 bit values. When multiplied together, the 31 bit result is stored in memory register 406 which may be, for example, a 48 bit accumulator.

It is noted that in the prior art solutions, at this point in the processing of the NLMS equation discussed above, a multiplication by the step size ($\mu$) as well as a division by the power estimate of the excitation signal ($P_{\overline{X}}$) remain to be performed. Now assume that the step size ($\mu$) is a signed 16 bit fractional value (e.g. Q1.15) and that the power estimate ($P_{\overline{X}}$) is a 32 bit value. One skilled in the art would recognize that at this point in the processing there is a 31 bit result in register 406, of which at most only 24 bits can be used in the next multiplication operation with—the step size ($\mu$), even though the accumulator could support a Q31.15 value from a full multiply. The product of this second multiplication is a 39 bit result (Q24.15), of which 15 bits are fractional and can be discarded and the most significant 24 bits retained for the next operation. To perform the final division, the 32 bit power estimate of the excitation signal is inverted to create a fractional value. Ideally, the fractional value should be at least a Q1.31 fraction, but since the arithmetic logic unit can only take 16 bits for the second operand, precision is lost once again as bits must be discarded to perform the final multiplication. In fact, for large power estimate values, the inverted result may be too small to be represented in the Q1.15 format which results in a zero value. When multiplied by the previous product of the error signal $e(n)$ and excitation signal $\overline{X}(n)$, the result is absolutely no coefficient update. This example not only demonstrates how bit precision is lost, thereby degrading echo canceller performance, but also the fact that the adaptation process can unexpectedly and disadvantageously stop because of finite word limitations. Reordering the multiplication operations such that the excitation signal is first multiplied with the step size, for example, will again result in the need to discard precision and may result in further precision loss when two small numbers are multiplied. Employing special techniques to prevent precision loss is prohibitively expensive in terms of computational power, and are thus impractical for real time implementations.

In accordance with the present invention, multiplication by the step size ($\mu$) and division by the power estimate of the excitation signal ($P_{\overline{X}}$) are both avoided. The power estimate of the excitation signal $P_{\overline{X}}$ is first compared against a reference power level $P_{REF}$. The reference power level $P_{REF}$ is a power level for which an appropriate step size, known as a reference step size, is already known. Thus, the present invention takes advantage of the recognition that there is a relationship between a reference power level and a reference step size. This relationship is empirically determined depending upon the particular implementation such that deep convergence is achieved within the desired convergence time. The present invention takes advantage of this relationship by implementing the NLMS equation term $\mu/P_{\overline{X}}$ as a binary bit shift of the product of the excitation signal $\overline{X}(n)$ and the error signal e(n), rather than a computation of the term $\mu/P_{\overline{X}}$. Thus, the reference step size is associated with a reference shift amount, and depending upon the comparison between the reference power level and the power estimate of the excitation signal, the reference shift is adjusted accordingly.

It is further pointed out that in an advantageous embodiment of the invention, the power estimate of the excitation signal $P_{\overline{X}}$ may be calculated as the running average of the absolute value of the excitation signal where a portion of the running average is subtracted and an equal portion of the new sample value is added to the new running average, as opposed to the more processor intensive average of the square of the signal.

Referring now to FIG. 3, in step 302 it is determined whether $P_{\overline{X}}$ is greater than or equal to $P_{REF}$. If true, then control is passed to step 304. Otherwise, control is passed to step 306. Variable Z is defined as a variable which stores the power of two by which $P_{\overline{X}}$ is greater or less than $P_{REF}$. If $P_{\overline{X}}$ is less than $P_{REF}$ then control passes to step 306 in order to determine the power of two by which $P_{REF}$ is greater than $P_{\overline{X}}$ as represented by the equation $$Z = int\left[\log_2\left(\frac{P_{REF}}{P_{\overline{X}}}\right)\right].$$

Figure 5:
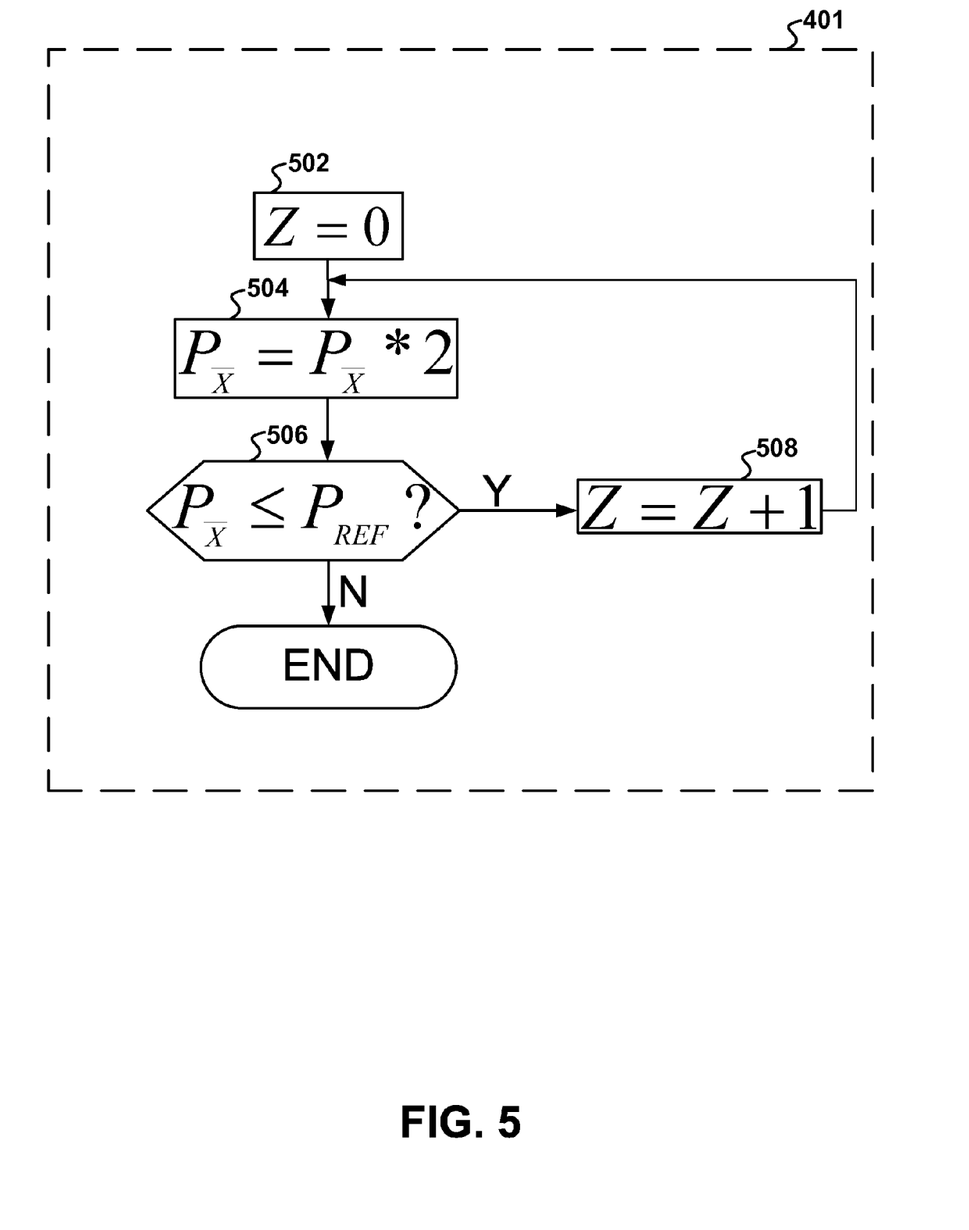
FIG. 5 is a flowchart showing the steps of one particular implementation of a calculation for determining the power of two by which a reference power level is greater than a power estimate of an excitation signal.

One particular implementation of the calculation of step 306 is shown in the flowchart of FIG. 5. First, in step 502 Z is set to zero. In step 504, $P_{\overline{X}}$ is multiplied by two (which in a binary representation in a computer system may be implemented by a single left shift of the bits). In step 506, it determined whether $P_{\overline{X}}$ is still less than $P_{REF}$. If $P_{\overline{X}}$ is still less than $P_{REF}$ then in step 508 Z is incremented by 1. Steps 504 through 508 are repeated until $P_{\overline{X}}$ is no longer less than $P_{REF}$ at which point processing ends and Z contains the whole number power of two by which $P_{REF}$ is greater than $P_{\overline{X}}$. Of course, there are various ways to implement the calculation of step 308, and the steps of FIG. 5 show only one such implementation.

Returning now to FIG. 3, if the test of step 302 determines that $P_{\overline{X}}$ is greater than or equal to $P_{REF}$, then control passes to step 304 in order to determine the power of two by which $P_{\overline{X}}$ is greater than $P_{REF}$ as represented by the equation $$Z = int\left[\log_2\left(\frac{P_{\overline{X}}}{P_{REF}}\right)\right].$$

While the equation of step 304 may be evaluated in a manner similar to that described for the equation of step 306, a more efficient process may be employed by taking advantage of the fact that $P_{REF}$ is a predetermined value. As such, in accordance with one embodiment of the invention, step 304 is evaluated as follows. First, since $P_{REF}$ is a predetermined value, the inverse of $P_{REF}$ is pre-computed as a constant $$c = \frac{1}{P_{REF}}.$$

The equation of step 304 may then be computed by the equation $Z=-(MSBD(P_{\overline{X}} \times c)-1)$, where MSBD represents the most significant bit detection opcode available on most processors. The MSBD opcode provides the bit position of the sign bit. For instance, MSBD returns bit number 5 for the value +24. For the value of 0, the MSBD command returns bit number 1. One skilled in the art will recognize that using the MSBD function as described will implement the equation $$Y = int\left[\log_2\left(\frac{P_{\overline{X}}}{P_{REF}}\right)\right] + 1.$$

from which subtracting 1 and negating the result yields Z of step 304. The result of step 304 will be a negative shift value.

After one of steps 304 or 306, processing proceeds with step 308 in which a number of shifts is calculated as SHIFT=REFERENCE SHIFT+(2×Z). Accordingly, if Z is positive (as calculated by step 306), then 2×Z is a positive number and the reference shift will increase, and if Z is negative (as calculated by step 304), then 2×Z is a negative number and the reference shift will decrease. Since a positive number shift represents a shift to the left, and a negative number shift represents a shift to the right, then a positive (2×Z) represents adjusting the reference shift to the left and a negative (2×Z) represents adjusting the reference shift to the right.

Next, in step 310 the product of an element of the excitation signal $\overline{X}(n)$ vector and the error signal e(n) is calculated and stored in register 406. It is then shifted (step 312) either left or right depending upon the value of the shift amount calculated in step 308 and the resultant value is used to update the filter coefficient in step 314. The process loops until all filter coefficients have been updated. Updating a subset of the filter coefficients on each sample using the above method is also permissible.

Binary shifts of memory registers are well known in the art. A binary shift moves each of the bits in the register a number of bit positions either left or right. The rightmost bit during a right shift, and the leftmost bit during a left shift, get dropped. A zero bit is generally inserted in the rightmost bit position during a left shift. During a right shift, the leftmost bit position is sign extended. As would be recognized by one skilled in the art, n binary shifts to the left represent a multiplication by $2^n$ and n binary shifts to the right represent a division by $2^n$. It is noted here that the value Z is multiplied by 2 in step 308 because the step size changes by the square of the power ratio of the excitation signal to the reference level.

The appropriate values for $P_{REF}$ as well as the reference shift amount will depend upon the particular implementation. The reference step size is selected such that the echo canceller adapts to deep convergence within the desired convergence time using an excitation signal that is characteristic of the application at the reference power level. The reference power level is chosen near the middle of the expected dynamic range of the excitation signal and such that the maximum expected right and left shifts is balanced and can be implemented by the processor 401. Processor limits may exist on the shift value and thereby require logic to detect the situation and choose the nearest possible shift. Since this check would be done once after the calculation of the shift amount and not during the coefficient update loop, it does not add substantial computational complexity to the adaptation algorithm. Approximate exemplary values for a speakerphone acoustic echo canceller are $P_{REF}$=4096 and reference shift=−7. Approximate exemplary values for a telephone network line echo canceller are $P_{REF}$=4096 and reference shift=−5. These values assume a 16 bit dynamic signal range.

The present invention provides several advantages over the prior art techniques for estimating and applying a step size value for LMS echo cancellers. First, in the above described embodiment, neither a division nor inverse function was employed. Instead, the step size is applied by shifting the product of the error signal and excitation signal and avoids the loss of precision that occurs in prior art implementations. It avoids precision loss due to multiple multiplication operations. The present invention further provides for improved echo cancellation performance with a lower processor 401 MIPS usage. The above described technique is advantageous for use in implementations having excitation signals with a wide dynamic range, such as speech implementations, and avoids unexpected stops in the adaptation process due to precision loss.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

The invention claimed is:

1. A method for determining echo canceller filter coefficients comprising:
   receiving an excitation signal at an echo canceller device comprising a processor;
   comparing a power estimate of the excitation signal to a reference power level at the processor;
   calculating a product of an element of an excitation signal vector and an error signal using the processor;
   storing the product as a plurality of bits using the processor;
   shifting the plurality of bits using the processor responsive to comparing the power estimate to the reference power signal; and
   determining a filter coefficient based on the shifted plurality of bits using the processor.

2. The method of claim 1 wherein comparing the power estimate of the excitation signal to the reference power level comprises generating a shift value.

3. The method of claim 1 wherein shifting the plurality of bits generates a filter coefficient update value.

4. The method of claim 3 further comprising:
   updating a filter coefficient in a plurality of filter coefficients based on the filter coefficient update value.

5. The method of claim 1 wherein shifting the plurality of bits is based on a ratio of the power estimate of the excitation signal and the reference power level.

6. The method of claim 1 wherein shifting the plurality of bits is based on a power of two by which the power estimate of the excitation signal is greater than the reference power level.

7. The method of claim 6 wherein shifting the plurality of bits comprises shifting the plurality of bits by a reference number of shifts adjusted at least in part based on the power of two.

8. The method of claim 7 wherein the reference number of shifts is adjusted using a right shift adjustment.

9. The method of claim 8 wherein the right shift adjustment is calculated as $(MSBD(P_{\bar{x}}*c)-1)*2$ where $P_{\bar{x}}$ is the power estimate, c is the inverse of the reference power level, and MSBD represents a most significant bit determination of a binary number representation.

10. The method of claim 1 wherein shifting the plurality of bits is based at least in part on a power of two by which the power estimate of the excitation signal is less than the reference power level.

11. The method of claim 10 wherein shifting the plurality of bits further comprises shifting the plurality of bits by a reference number of shifts adjusted at least in part based on the power of two.

12. The method of claim 11 wherein the adjustment is a left shift adjustment.

13. The method of claim 12 wherein the adjustment is calculated as 2 times the power of two.

14. The method of claim 1, further comprising:
   generating an echo signal estimate, based on a plurality of filter coefficients, using the processor.

15. The method of claim 14, further comprising:
   canceling an echo based on the echo signal estimate.

16. The method of claim 15, wherein canceling the echo comprises subtracting the echo signal estimate from an echo signal.

17. The method of claim 1, wherein determining the filter coefficient based on the shifted plurality of bits comprises determining a filter coefficient in accordance with a least means squares (LMS) algorithm.

18. The method of claim 17, wherein the LMS algorithm is a normalized LMS algorithm.

19. An echo canceller, comprising:
   means for storing a plurality of bits;
   means for comparing a power estimate of an excitation signal to a reference power level;
   means for calculating the product of an element of an excitation signal vector and error signal and storing the product in the means for storing;
   means for shifting the plurality of bits in the memory register based on the means for comparing; and
   means for determining a filter coefficient based on the shifted plurality of bits.

20. The echo canceller of claim 19 wherein the means for comparing is configured to generate a shift value.

21. The echo canceller of claim 19 wherein the means for shifting is configured to generate a filter coefficient update value.

22. The echo canceller of claim 21 further comprising:
   means for updating a filter coefficient in the plurality of filter coefficients based on the filter coefficient update value.

23. The echo canceller of claim 19 wherein the means for shifting the plurality of bits further comprises means for shifting the plurality of bits based on a power of two of the power estimate of the excitation signal and the reference power level.

24. The echo canceller of claim 19 wherein the means for shifting the plurality of bits further comprises means for shifting the plurality of bits based at least in part on a power of two by which the power estimate of the excitation signal is greater than the reference power level.

25. The echo canceller of claim 24 wherein the means for shifting the plurality of bits further comprises means for shifting the plurality of bits by a reference number of shifts adjusted at least in part based on the power of two.

26. The echo canceller of claim 25 wherein the adjustment is a right shift adjustment.

27. The echo canceller of claim 26 further comprising means for calculating the adjustment as $(MSBD(P_{\bar{x}}*c)-1)*2$ where $P_{\bar{x}}$ is the power estimate, c is the inverse of the reference power level, and MSBD represents a most significant bit determination of a binary number representation.

28. The echo canceller of claim 19 wherein the means for shifting the plurality of bits further comprises means for shifting the plurality of bits based at least in part on a power of two by which the power estimate of the excitation signal is less than the reference power level.

29. The echo canceller of claim 28 wherein the means for shifting the plurality of bits further comprises means for shifting the plurality of bits by a reference number of shifts adjusted at least in part based on the power of two.

30. The echo canceller of claim 29 wherein the adjustment is a left shift adjustment.

31. The echo canceller of claim 30 further comprising means for calculating the adjustment as 2 times the power of two.

32. The echo canceller of claim 19, further comprising:
means for generating an echo signal estimate, based on a plurality of filter coefficients.

33. The echo canceller of claim 32, further comprising:
means for canceling an echo based on the echo signal estimate.

34. The echo canceller of claim 33, wherein the means for canceling the echo comprise means for subtracting the echo signal estimate from an echo signal.

35. The echo canceller of claim 19, wherein the means for determining the filter coefficient based on the shifted plurality of bits comprises means for determining a filter coefficient in accordance with a least means squares (LMS) algorithm.

36. The echo canceller of claim 35, wherein the LMS algorithm is a normalized LMS algorithm.

37. An echo canceller device, comprising:
a line, configured for receiving an excitation signal; and
a processor, configured for:
determining a comparison between a power estimate of the excitation signal to a reference power level,
calculating a plurality of bits representing a product of an element of an excitation signal vector and an error signal,
shifting the plurality of bits based on the comparison, and
determining a filter coefficient based on the shifted plurality of bits.

38. The echo canceller of claim 37 wherein the processor is configured for determining the comparison by determining a power of two by which the power estimate of the excitation signal is greater than the reference power level.

39. The echo canceller of claim 38, wherein the processor is configured for shifting the plurality of bits by left shifting the plurality of bits by a reference number of shifts adjusted at least in part based on the power of two.

40. The echo canceller of claim 37, wherein the processor is configured for determining the comparison by determining a power of two by which the power estimate of the excitation signal is less than the reference power level.

41. The echo canceller of claim 40, wherein the processor is configured for shifting the plurality of bits by right shifting the plurality of bits by a reference number of shifts adjusted at least in part based on the power of two.

42. The echo canceller of claim 37, wherein the processor is further configured for:
generating an echo signal estimate, based on a plurality of filter coefficients, wherein the plurality of filter coefficients comprises the filter coefficient; and
canceling an echo based on the echo signal estimate.

* * * * *